(No Model.)

A. J. & M. C. GUFFIN.
WASHING MACHINE.

No. 310,507. Patented Jan. 6, 1885.

WITNESSES:

INVENTOR:
A. J. Guffin
M. C. Guffin
BY
Munn & Co
ATTORNEYS.

UNITED STATES PATENT OFFICE.

ANDREW J. GUFFIN AND MATILDA C. GUFFIN, OF RUSHVILLE, INDIANA.

WASHING-MACHINE.

SPECIFICATION forming part of Letters Patent No. 310,507, dated January 6, 1885.

Application filed November 10, 1883. (Model.)

*To all whom it may concern:*

Be it known that we, ANDREW J. GUFFIN and MATILDA C. GUFFIN, both of Rushville, in the county of Rush and State of Indiana, have invented a new and Improved Washing-Machine, of which the following is a full, clear, and exact description.

Our invention consists in the construction and arrangement of parts, as will be hereinafter fully described and claimed.

Reference is to be had to the accompanying drawings, forming part of this specification, in which similar letters of reference indicate corresponding parts in both the figures.

Figure 1:
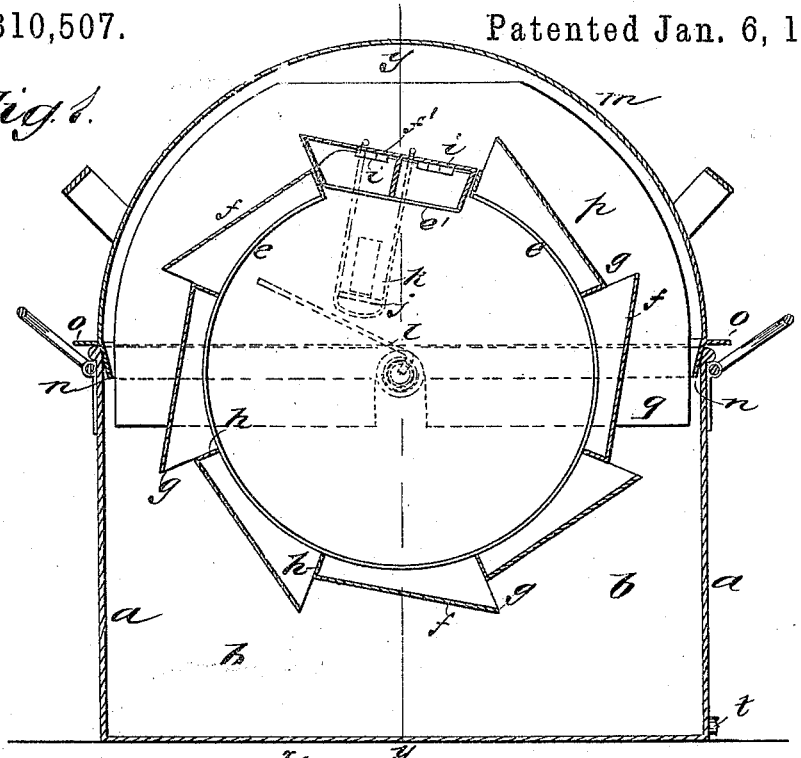
Figure 2:
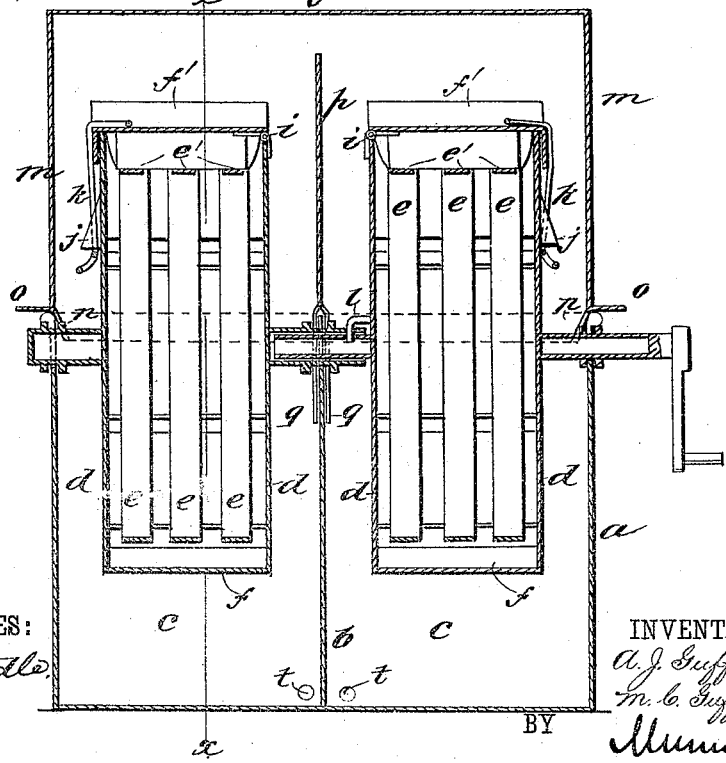

Figure 1 is a sectional elevation of our improved washing-machine, taken on the line $x$ $x$ of Fig. 2; and Fig. 2 is a section on the line $y$ $y$ of Fig. 1.

We make a suitable boiler, $a$, preferably in rectangular form, or substantially so, and preferably with a partition, $b$, at the middle, separating it into two compartments, $c$, in each of which we arrange a hollow drum or wheel, $d$, to receive and hold the clothes within the rings $e$, forming a sectional rim to each drum, outside of which rim buckets $f$ are attached, which are open at the front end, $g$, and closed by a riser, $h$, at the back end, so that when the wheels are turned forward the water will be scooped in by the buckets and thrown into the interior of the wheel by said buckets and the risers to take effect on the clothes by flowing through them and escaping from the front ends of the buckets above the water-level both on the ascending and descending sides of the wheel. One of the buckets, $f'$, and sections $e'$ of the rings are detached from the rest and fixed on hinges $i$, and provided with a catch, $j$, and spring-hasp $k$, to be opened for putting in and taking out the clothes, and fastened to retain them. We prefer to employ a boiler in two sections, with a wheel in each, but may have more, or only one section and wheel. When we use two or more wheels we prefer to connect the shafts of the wheels detachably by a spring-catch, $l$, or other means by which the wheels may be readily connected together or disconnected for being turned together or not, as may be preferred. In this case the shafts of the wheels are made hollow, with one entering the other at the middle bearing, and the spring-catch $l$ is attached to the side of one of the wheels, so as to hook into holes of the two shafts and connect them together; but any approved form of coupling device may be used. A suitable removable cover, $m$, is provided to close the top of the boiler, said cover having a flange, $n$, to drop down inside of the top of the boiler and another flange, $o$, to rest on the top. The inside flange prevents water from escaping through the cover-joint onto the stove. The partition $b$, separating the two sections $c$, has a removable extension, $p$, to be put on when required to prevent the water from being forced over from one section to the other, said extension-partition $p$ having a double section of the lower part formed of two thin plates, $q$, located side by side and forming a deep groove, enabling the partition $p$ to be set down on the top of $b$ and be thereby supported in its position so as to serve its purpose, and so that it can be readily lifted off and as readily put on when required. The wheel-shafts are fitted in bearings in the sides of the boiler and in the partition $b$, so that they may be lifted out of the boiler and put in at will. These bearings may be constructed in any approved way. Two or more sections and drums are employed in order that two batches of different kinds of clothes may be washed at once, and so that when desired a batch may be removed from a first washing in one drum to cleaner water in a second drum for a second washing.

The door by which to put in and take out the clothes may be arranged in the side of the drum instead of the rim, if preferred. The boiler will have suitable faucets, $t$, to draw off the water, and the boiler may be made of any kind of sheet metal or other suitable material.

Having thus described our invention, what we claim as new, and desire to secure by Letters Patent, is—

1. A wash-boiler consisting of two or more separate and independent sections, $c$ $c$, in combination with drums or wash-wheels journaled therein on independent journals, and a clutch mechanism for engaging and holding said shafts together, whereby the said wheels may be operated separately or together, substantially as set forth.

2. A wash-boiler consisting of two separate and independent sections, c, in combination with the wash-wheels or drums, journaled separately therein, and provided at their adjacent faces with hollow apertured journals fitting one within the other, and the spring locking-catch l, for securing said journals together when desired, substantially as set forth.

3. The combination, with the boiler a, partition b, and its removable extension p, forming independent sections c c, of the drums d, journaled therein, substantially as set forth.

ANDREW J. GUFFIN.
MATILDA C. GUFFIN.

Witnesses:
JESSE J. SPURM,
JOHN Q. THOMAS.